(12) United States Patent
Na et al.

(10) Patent No.: US 9,619,861 B2
(45) Date of Patent: Apr. 11, 2017

(54) APPARATUS AND METHOD FOR IMPROVING QUALITY OF ENLARGED IMAGE

(71) Applicant: Samsung Electronics Co., Ltd., Gyeonggi-do (KR)

(72) Inventors: Jin-Hee Na, Seoul (KR); Min-Chul Kim, Busan (KR); Jae-Sik Sohn, Gyeonggi-do (KR); Young-Kwon Yoon, Seoul (KR)

(73) Assignee: Samsung Electronics Co., Ltd (KR)

( * ) Notice: Subject to any disclaimer, the term of this patent is extended or adjusted under 35 U.S.C. 154(b) by 257 days.

(21) Appl. No.: 13/779,128

(22) Filed: Feb. 27, 2013

(65) Prior Publication Data

US 2013/0265311 A1   Oct. 10, 2013

(30) Foreign Application Priority Data

Apr. 4, 2012   (KR) .................. 10-2012-0035060

(51) Int. Cl.
 *G06T 3/40*   (2006.01)

(52) U.S. Cl.
 CPC ...... *G06T 3/40* (2013.01); *G06T 2207/20212* (2013.01); *G06T 2207/20221* (2013.01)

(58) Field of Classification Search
 USPC .................................. 345/418, 428
 See application file for complete search history.

(56) References Cited

U.S. PATENT DOCUMENTS

| 7,130,490 B2* | 10/2006 | Elder ............... G08B 13/19643 348/584 |
| 2006/0126082 A1 | 6/2006 | Choi |
| 2007/0076099 A1* | 4/2007 | Eshed ............... H04N 5/23232 348/218.1 |
| 2010/0321536 A1 | 12/2010 | Lee et al. |
| 2011/0121178 A1* | 5/2011 | Strandemar ............... G01J 5/02 250/332 |

FOREIGN PATENT DOCUMENTS

| KR | 1020050095082 | 9/2005 |
| KR | 1020060067051 | 6/2006 |
| KR | 1020070030501 | 3/2007 |
| KR | 1020100137618 | 12/2010 |
| KR | 1020110090098 | 8/2011 |

* cited by examiner

*Primary Examiner* — Yuwen Pan
*Assistant Examiner* — Zhitong Chen
(74) *Attorney, Agent, or Firm* — The Farrell Law Firm, P.C.

(57) ABSTRACT

A method and apparatus for improving quality of an enlarged image are provided. The apparatus includes first and second image input units for outputting first and second images which are obtained by capturing the same subject at different positions spaced apart by a predetermined gap, a first image processor for converting a resolution of the first image to a preview resolution, a display for displaying the first image from the first image processor, a second image processor for, when an area to be enlarged in the displayed first image is selected, cropping an area corresponding to the selected area from the second image, and a controller for controlling the display to display the cropped area on the first image in an overlaying manner. Consequently, a user may view a high-magnification image cropped from a high-definition image and an original image together.

17 Claims, 7 Drawing Sheets

APPARATUS AND METHOD FOR IMPROVING QUALITY OF ENLARGED IMAGE

PRIORITY

This application claims priority under 35 U.S.C. §119(a) to an application filed in the Korean Intellectual Property Office on Apr. 4, 2012 and assigned Serial No. 10-2012-0035060, the entire disclosure of which is incorporated herein by reference.

BACKGROUND OF THE INVENTION

1. Field of the Invention

The present invention relates generally to an apparatus and method for processing images, and more particularly, to an apparatus and method for improving the quality of an image of an enlarged portion when a portion selected from a preview image is enlarged.

2. Description of the Related Art

Generally, an image sensor is mounted in image processing devices such as cameras, camcorders and webcams, and the image sensor captures images, converts the captured images into electrical signals, and converts the electrical image signals into digital image signals. The image signals are displayed on an image output unit. These image processing devices provide a variety of screen control schemes, such as, for example, a scaling scheme.

The existing mono camera-based input image scaling schemes include a digital zoom scheme and an advanced zoom scheme.

The digital zoom scheme is used in a preview step and the like, in which a user may view captured images in advance, and this scheme can upscale selected areas by applying a software implemented resize. Accordingly, the digital zoom scheme may enlarge or upscale an area that a user selects from an image received through one image sensor, and display it together with the input image. However, high resolution image signals are not required for preview, to achieve fast processing of image signals. That is, the digital zoom scheme is used to process low-resolution input images, so enlarged images may have low resolution, causing demand for the improvement in image quality.

Conversely, the advanced zoom scheme enlarges the area that a user selects from an image having the same size as that of one image sensor, so the enlarged image may have high resolution. However, the advanced zoom scheme can show only the area selected by the user at high resolution, but may not show an input image other than the area selected by the user, together with an image corresponding to the area selected by the user.

As described above, the digital zoom scheme outputs an input image and an image of an enlarged portion on separate screens, as different small screens are provided on the entire screen, similar to the Picture-In-Picture (PIP) function, so the user may simultaneously view the input image and the selected portion. However, the selected portion may undergo degradation of image quality. Conversely, the advanced zoom scheme may ensure high resolution for the selection portion, but may not allow the user to simultaneously view the input image and the selected portion.

SUMMARY OF THE INVENTION

Accordingly, an aspect of the present invention is to solve the above-mentioned problems occurring in the prior art, and to provide at least the advantages below. According to an aspect of the present invention, an image processing device and method is provided, for simultaneously displaying a preview image and an enlarged image of a selected area without degradation of the image quality.

According to another aspect of the present invention, an image processing device and method is provided, for simultaneously displaying a preview image and an enlarged image for a selected area by differentiating magnifications of images received through two or more cameras.

In accordance with one aspect of the present invention, there is provided an apparatus for improving quality of an enlarged image. The apparatus includes a first image input unit and a second image input unit configured to output a first image and a second image, respectively, which are obtained by capturing a same subject from different positions, spaced apart by a predetermined gap, a first image processor configured to convert a resolution of the first image to a preview resolution, a display configured to display the first image from the first image processor, a second image processor configured to crop an area corresponding to the selected area from the second image, when an area to be enlarged in the displayed first image is selected, and a controller configured to control the display to display the cropped area on the first image in an overlaying manner.

In accordance with another aspect of the present invention, there is provided a method for improving quality of an enlarged image in an image processing device. The method includes receiving a first image and a second image, each of which is obtained by capturing a same subject from different positions, spaced apart by a predetermined gap, converting a resolution of the first image to a preview resolution, displaying the first image, and determining whether an area to be enlarged in the displayed first image is selected, when the area to be enlarged is selected, cropping an area corresponding to the selected area from the second image, and displaying the cropped area on the first image in an overlaying manner.

BRIEF DESCRIPTION OF THE DRAWINGS

The above and other aspects, features and advantages of various embodiments of the present invention will be more apparent from the following description taken in conjunction with the accompanying drawings, in which.

DETAILED DESCRIPTION OF THE EMBODIMENTS OF THE PRESENT INVENTION

Various embodiments of the present invention are described in detail with reference to the accompanying drawings. In the following description, the same drawing reference numerals refer to the same elements, features and structures throughout the drawings. In addition, descriptions of well-known functions and configurations are omitted to avoid obscuring the subject matter of the present invention.

The present invention provides a method for selecting a specific area from an original image, enlarging an image for the selected area, and displaying the enlarged image together with the original image without degradation of the image quality in an image processing device equipped with two or more cameras. An image process device according to an embodiment of the present invention includes first and second image input units for outputting first and second images which are obtained by capturing the same subject at different positions spaced apart by a predetermined gap, a first image processor for determining a resolution for the first image and lowering a resolution of the first image to the determined resolution, a second image processor for determining a resolution for the second image to be higher than the resolution of the first image, setting the resolution of the second image to the determined resolution, compensating for a position difference between the first and second images, and determining a crop area from the second image, and a display for displaying a high-magnification image corresponding to the crop area on the first image in an overlaying manner. Accordingly, a user may view a high-magnification image cropped from a high-definition image, together with the original image.

In a recent trend, a variety of mobile terminals equipped with a stereo camera have been developed. In line with this trend, many studies are underway to acquire three-dimensional (3D) stereoscopic pictures or videos using the stereo camera, or to obtain depth information from images. In addition, mobile terminals equipped with multiple cameras also have been developed to facilitate self-portraits, panoramic view shooting, and the like. In many cases, stereo cameras and multiple cameras generate images based on the same magnification by the same processing. That is, left and right-eye images generated by the stereo camera are the same resolution, and images generated by the multiple cameras are also the same resolution. However, the utilization of these multiple cameras needs to be diversified.

Accordingly, an aspect of the present invention provides multiple cameras used to acquire an original image and an enlarged high-magnification image at the same time. According to an aspect of the present invention, different small screens are provided on the entire screen like the Picture-In-Picture (PIP) function, and an input image and an image of an enlarged portion are output on their associated screens, so the user may simultaneously view the input image and the selected portion.

The operation and structure of an image processing device, according to an embodiment of the present invention, is described with reference to FIG. 1. The image processing device, according to an embodiment of the present invention, includes devices supporting a shooting function, such as smart phones, mobile phones, tablet Personal Computers (PCs), and digital cameras. Although a stereo camera is used to describe various embodiments of the present invention, it will be apparent to those of ordinary skill in the art that multiple cameras that capture a subject at the same time may also be used.

Figure 1:
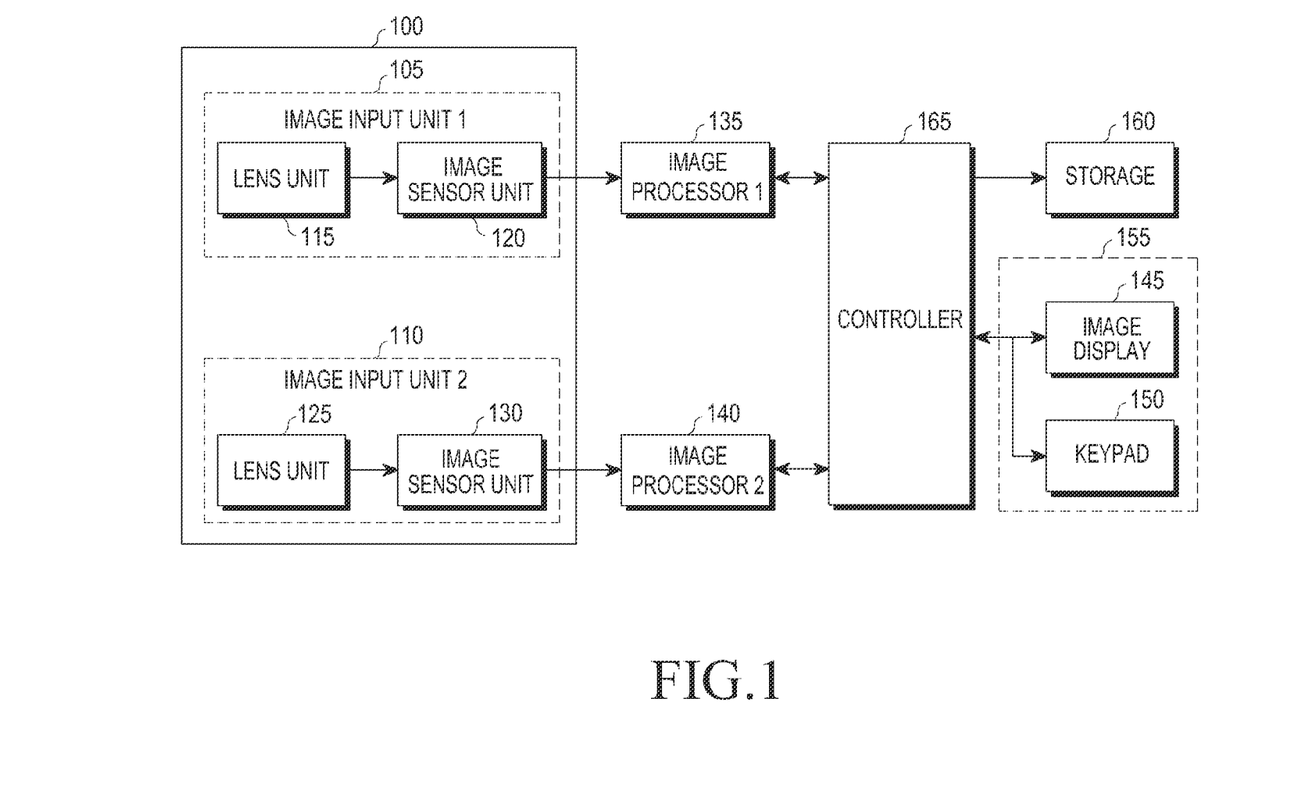
FIG. 1 is a diagram illustrating an internal structure of an image processing device, according to an embodiment of the present invention.

Referring to FIG. 1, the image processing device includes an image input unit 100, a first image processor 135, a second image processor 140, an image display 145, a keypad 150, a storage 160, and a controller 165.

The image input unit 100 includes two or more image input units. The image processing device is equipped with a stereo camera, according to an embodiment of the present invention, and first and second image input units 105 and 110 correspond to left and right cameras, respectively. Accordingly, the second image input unit 110 is mounted in a position that is spaced apart from the first image input unit 105 by a predetermined distance. The image input unit 100 generates left and right-eye images for a subject, using the first and second image input units 105 and 110, respectively.

Each of the first and second image input units 105 and 110 includes a lens unit 115 (125) and an image sensor unit 120 (130), which are distinguishable for the left and right eyes. A first image output form the first image input unit 105 and a second image output from the second image input unit 110 are transferred to the first image processor 135 and the second image processor 140, respectively. The first and second image input units 105 and 110 capture the same subject from the left and right positions which are spaced apart along the horizontal axis by a predetermined gap, so the first and second images correspond to the left and right-eye images for the subject, respectively. A difference between the left and right positions spaced apart by a predetermined gap corresponds to a position difference between the image sensors 120 and 130 that capture the subject, as the first and second image input units 105 and 110 are mounted on the portable image processing device. Even though a subject in front of the image processing device is captured, parallax may occur in the left and right-eye images obtained by capturing the subject, in proportion to the distance between the subject and the first and second image input units 105 and 110, respectively.

When the first image output from the first image processor 135 is an image for preview, the first image processor 135 lowers a resolution of the first image to a predetermined low-resolution value. That is, the first image processor 135 reduces or shrinks the size of the first image to a size smaller than the original size. The low-resolution value for previewing the image corresponds to the resolution which is set smaller than the full size of the first image, and determined depending on the user's settings, or the value which is set in advance during the launch of the image processing device.

Conversely, a resolution of the second image output from the second image processor 140 is set to be higher than the resolution of the first image. Accordingly, the resolution of the second image is set to a predetermined high-resolution value. The resolution of the second image is changed to a resolution higher than the resolution of the first image, and may also be maintained at an n×m pixel size, which is the pixel size of the image sensor 130. Here, the second image is used for image recognition and the like, instead of being used to generate a stereoscopic image using the existing stereo camera, because the second image has a high resolution. Examples of image recognition include remote face recognition, remote scene (object) recognition, remote Quick Response (QR) code recognition, etc.

The image display 145 displays images, and may be implemented as a Plasma Display Panel (PDP), Liquid Crystal Display (LCD), Organic Light Emitting Diodes (OLED), Light Emitting Diodes (LED), and the like.

The keypad 150 is the means to receive user inputs, and includes a physical keypad (not shown) formed on the image processing device, or a virtual keypad (not shown) that is displayed on a touch screen when the image display 145 is implemented as a touch screen.

A user interface 155 including the image display 145 and the keypad 150 may be implemented as a touch screen. The user interface 155 provides the user with access to functionality and corresponding various services (e.g., call, data transmission, broadcast, picture taking). In the present invention, items include icons, pictures, menus, links (e.g., displayed in texts) on the web page, and the like. Accordingly, the user may select an area to enlarge from the image displayed on the image display 145, using the keypad 150 or through the touch input.

The storage 160, under control of the controller 165, stores the Operating System (OS) of the image processing device, a variety of applications, information input to the image processing device, information generated therein, and the like. In addition, the storage 160 stores the image processing results, and temporarily stores in a buffer the data needed in the first and second image processors 135 and 140 during image processing, or temporarily stores the resulting data.

The term "storage" as used herein includes the storage 160, a Read Only Memory (ROM) a Random Access Memory (RAM) in the controller 165, or a memory card (not shown, e.g., Secure Digital (SD) card, memory stick, etc.) mounted in the image processing device. The storage 160 includes a non-volatile memory, a volatile memory, a Hard Disk Drive (HDD), or a Solid State Drive (SSD).

The controller 165, implemented as a Central Processing Unit (CPU), controls the overall operation of the image processing device, as described below. Although the controller 165, the first image processor 135, and the second image processor 140 are implemented as individual modules in FIG. 1 as one example, alternatively operations in the first and second image processors 135 and 140 may be implemented and performed in the controller 165. In addition, an image processing device and method according to an embodiment of the present invention are implemented in a machine-readable storage medium suitable for storing a program or programs including instructions for performing the image processing method, using software, hardware or a combination thereof.

Figure 2:
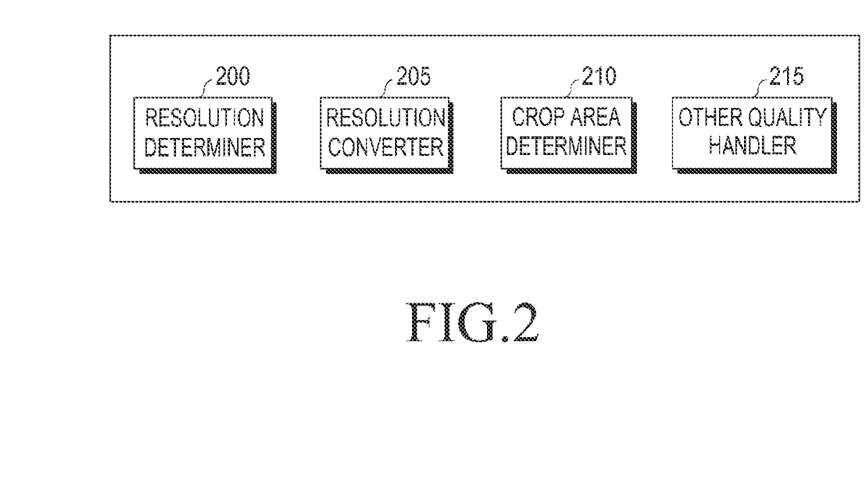
FIG. 2 is a diagram illustrating a detailed structure of the image processor in FIG. 1, according to an embodiment of the present invention.

Referring to FIG. 2, each of the first and second image processors 135 and 140 includes a resolution determiner 200, a resolution converter 205, a crop area determiner 210, and other quality handler 215.

The resolution determiner 200 determines a resolution for an input image depending on a user's input or a predetermined resolution value. For example, the resolution determiner 200 may set a low resolution for the first image, and a high resolution for the second image. Also, the resolution determiner 200 may set a high resolution for both the first and second images. When a resolution for the first image is determined as a resolution having a smaller size than the size of an image output from the first image input unit 105, the first image may be suitable for preview images displayed on the image display 145 to enable fast image processing. Accordingly, preview images are updated and displayed on the image display 145 in every frame. Conversely, when the second image is set to have a higher resolution compared to the first image, a resolution for the second image may be determined to have a pixel size of the image sensor 130 in the second image input unit 110. For example, when resolutions for the first and second images are set as different values, the resolution of the second image may be determined within a range between the highest resolution and a resolution which is higher by one level than the resolution of the first image.

The resolution converter 205 converts resolutions of the first and second images depending on the resolution determined by the resolution determiner 200.

The crop area determiner 210 may determine a portion of the high-resolution image (e.g., the second image) as a crop area depending on the user's selection. The crop area determiner 210 compensates for an image difference depending on a position difference between the first and second image input units 105 and 110. The image difference compensation is described below.

For example, the crop area determiner 210 reduces or shrinks the second image to a resolution of the first image, i.e., reduces the second image to the size of the first image, and then, calculates a shift value for a crop area of the second image on the basis of a selected area of the first image, to determine how much to shift the crop area of the second area reduced to correspond to the selected area of the first image, for parallax adjustment. That is, the crop area determiner 210 determines a crop area of the second image, shifted by a position difference between the first and second images.

The other quality handler 215 performs processing for improving the quality of the first and second images having different resolutions. Examples of processing for improving the quality of images include noise reduction, gamma correction, color correction, color enhancement, and the like.

A method for simultaneously displaying an enlarged image together with the original image in an image processing device having the above-described structure is described below.

Figure 3:
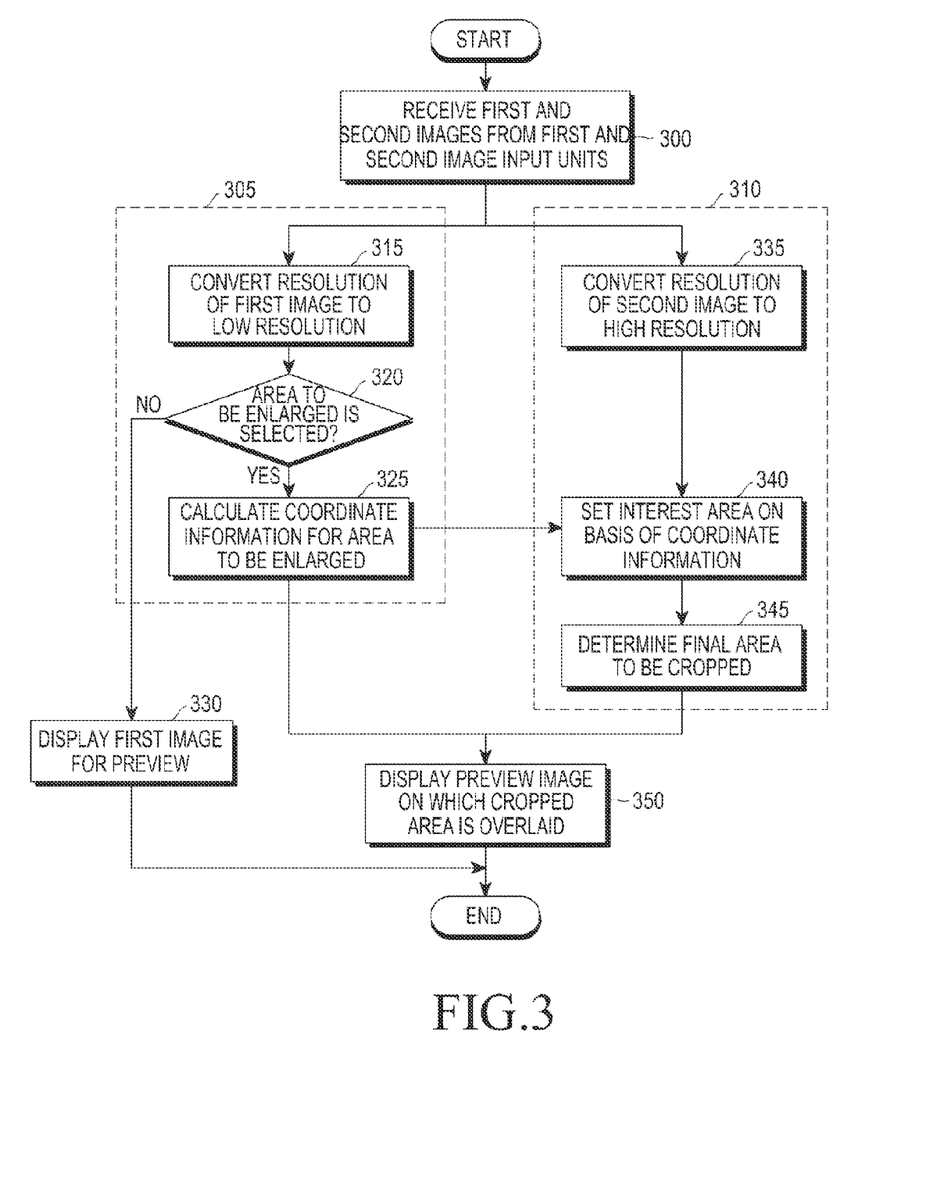
FIG. 3 is a flowchart illustrating an operation of an enlarged image processing method, according to an embodiment of the present invention.

FIG. 3 is a flowchart illustrating an operation of an enlarged image processing method according to an embodiment of the present invention. In FIG. 3, the first and second image input units 105 and 110 have the same resolution.

Referring to FIG. 3, in Step 300, the image processing device receives first and second images from the first and second image input units 105 and 110, respectively. FIG. 3 illustrates a first process 305 of processing the first image from the first image input unit 105, and a second process 310 of processing the second image from the second image input unit 110. The first process 305 may be performed in the first image processor 135, and the second processor 310 may be performed in the second image processor 140. Alternatively, the operation in FIG. 3 is implemented to be performed in the controller 165.

In the first process 305, the image processing device converts a resolution of the first image to a low resolution depending on a predetermined value or a user input in Step 315. When an area to be enlarged is selected in Step 320, the image processing device calculates coordinate information about the area to be enlarged, in Step 325. Conversely, when an area to be enlarged is not selected, the image processing device displays the first image for preview on the display screen in Step 330.

Figure 4:
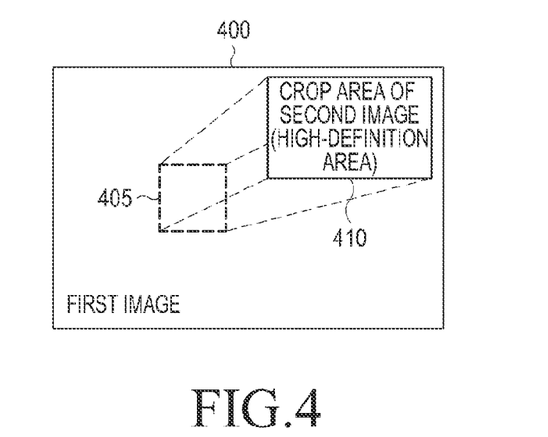
FIG. 4 is a diagram illustrating a screen control method for an image processing device, according to an embodiment of the present invention.

FIG. 4 is a diagram illustrating a screen control method for an image processing device according to an embodiment of the present invention. Upon the start of image capturing, the first image, which is a preview image received from the first image input unit 105, is displayed on a screen 400 of the image processing device. Upon receiving a request for enlarging a selected area 405 from the user interface 155 while displaying the first image, the image processing device displays a crop area 410 of the second image, which corresponds to the selected area 405, on the first image in an overlaying manner. Consequently, since a part of the high-definition second image, which corresponds to the selected area, is displayed on the low-definition first image in an overlaying manner, the user may view the high-definition enlarged image. The magnification ratio, the position and the like of the enlarged image 410 displayed on the first image are adjustable depending on the user's input.

Conversely, in the second process 310, the image processing device converts a resolution of the second image to be higher than the resolution of the first image in Step 335. Subsequently, the image processing device sets an interest area based on coordinate information about an area to be enlarged, in Step 340, and then determines a final area to be cropped within the interest area in Step 345. The term "interest area" refers to an area that is expanded to the left of a left camera, when the first image is an image from the left camera and the second image is an image from a right camera.

According to an embodiment of the present invention, since the first and second image input units 105 and 110 are disposed to be spaced apart by a predetermined gap, a position difference occurs between the first and second images even though the same subject is captured by the first and second image input units 105 and 110, as described with reference to FIG. 5.

Figure 5:
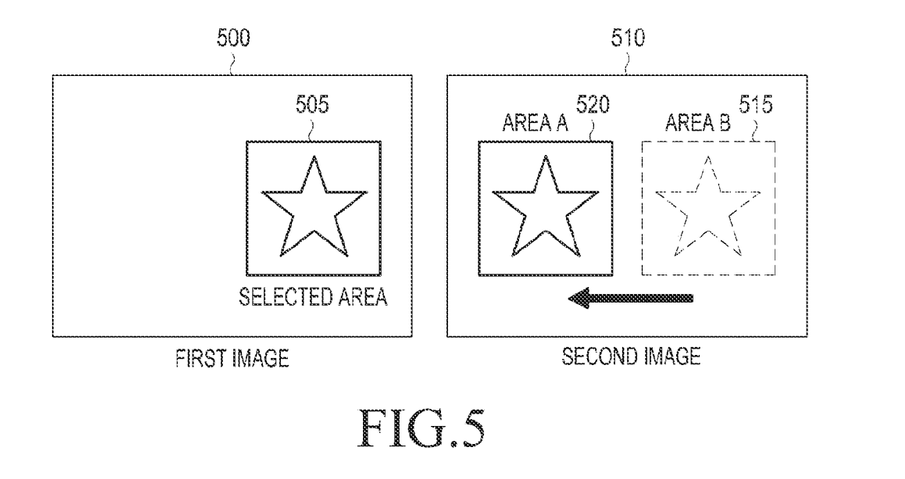
FIG. 5 is a diagram illustrating a position difference between selected areas in first and second images, according to an embodiment of the present invention.

FIG. 5 is a diagram illustrating a position difference between selected areas in first and second images according to an embodiment of the present invention.

Referring to FIG. 5, when a first image 500 is an original image for preview, the user may select an area 505 to crop based on the original image. Where the crop area is determined in a second image 510, a B area 515 corresponding to the selected area 505 is shifted to an A area 520 on the left. A position difference between the A area 520 and the B area 515 is dependent on the position difference between the first and second image input units 105 and 110. Therefore, the image processing device needs to determine the actual crop area within the second image 510 by calculating a shift value between the A area 520 and the B area 515. Specifically, when the first image 500 is a low-resolution preview image, the user may select an area to crop from the high-definition second image 510 based on the preview image. Here, the low-resolution first image and the second image where a crop area is to be selected, is different in size, so the size difference is also considered.

Accordingly, in an embodiment of the present invention, a crop area is determined in the high-definition image as described below.

Figure 6:
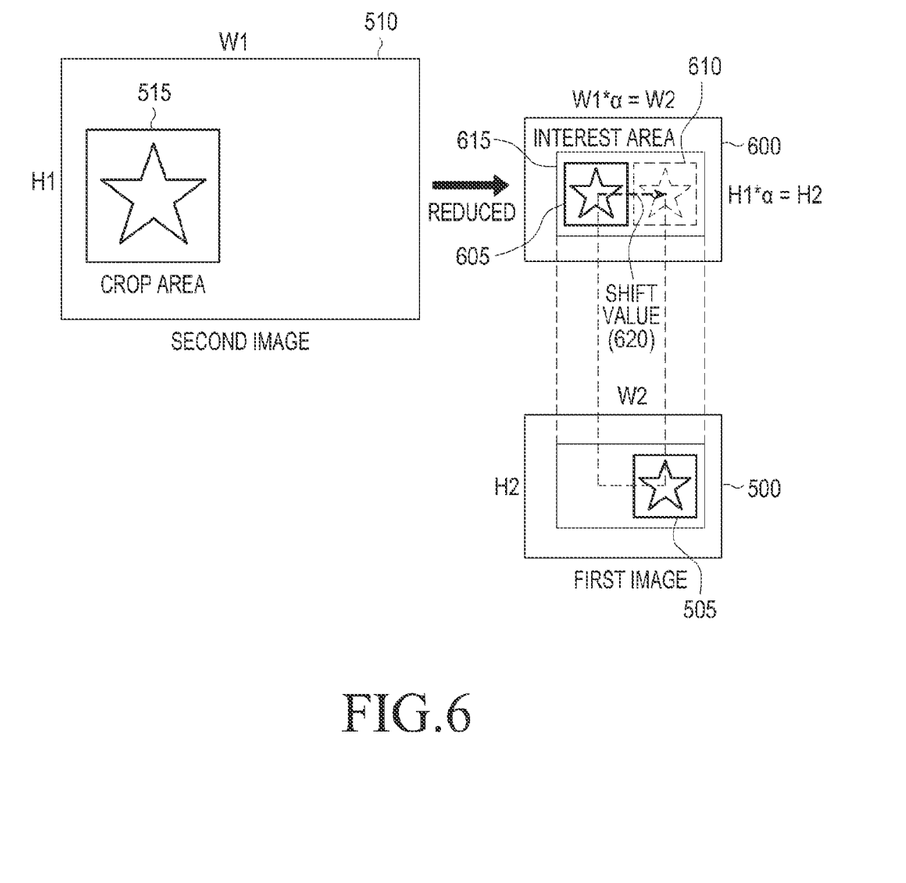
FIG. 6 is a diagram illustrating a method for compensating for a position difference, according to an embodiment of the present invention.

FIG. 6 is a diagram illustrating a method for compensating for a position difference according to an embodiment of the present invention.

Referring to FIG. 6, upon receiving a full-size or high-resolution second image 510, the second image processor 140 resizes the high-resolution second image 510 to be equal in size to the low-resolution first image 500. For example, when the second image 510 has a W1×H1 pixel size, the resized image 600 has a (W1*α)×(H1*α) pixel size, where α represents a shrinking magnification. The (W1*α)×(H1*α) pixel size of the resized image 600 is the same as a W2×H2 pixel size of the first image 500. That is, the size of the second image is reduced to the size of the first image.

Subsequently, the image processing device sets an interest area 615 in the resized image 600 based on the selected area 505 of the first image 500. The interest area 615 is an area expanded to the left based on the selected area 505 of the first image 500, when the first image input unit 105 corresponds to a left camera. Image matching technology is used to calculate how much the image processing device shifts the crop area 605 within this interest area 615. For example, the image processing device calculates a shift value 620 for the selected area 505 by extracting feature information of the image from the selected area 505 of the first image 500. The feature information includes corner points, borders, templates (patches consisting of pixels), etc.

As illustrated in FIG. 6, the shift value for the selected area 505 is calculated based on the difference between the center points of the selected area 505 and the crop area 605. Examples of this image matching technology includes template matching, feature point matching, Cepstral filtering, etc. When the shift value is calculated, the left area 605 instead of the right area 610 is determined as an area to be finally cropped within the reduced second image 600. Thereafter, by multiplying the shift value by a reciprocal of the shrinking magnification α, the image processing device obtains the actual coordinates of the crop area 515 in the high-resolution second image 510.

When the shift value of the final crop area 610 is calculated based on the selected area 505 in this manner, the crop area 515 in the high-resolution second image 510 is determined by scale conversion. By doing so, in Step 350, the image processing device displays a preview image on which the high-definition crop area 410 is overlaid, as illustrated in FIG. 4.

Conversely, when the first and second image input units 105 and 110 have different resolutions, or their resolutions are changed depending on the predetermined value, the first and second images are different in resolution as in FIG. 6. Thus, the image processing device determines an area to crop in the reduced high-resolution second image, enlarges the determined area back by scaling, and then finally determines a crop area from the enlarged second image. By solving the problem that the hardware structure may not be implemented in the existing mono camera-based mobile devices, aspects of the present invention allow the image processing device such as a mobile phone to simultaneously acquire two images having different magnifications, facilitating utilization of a wide variety of related applications.

Figure 7A:
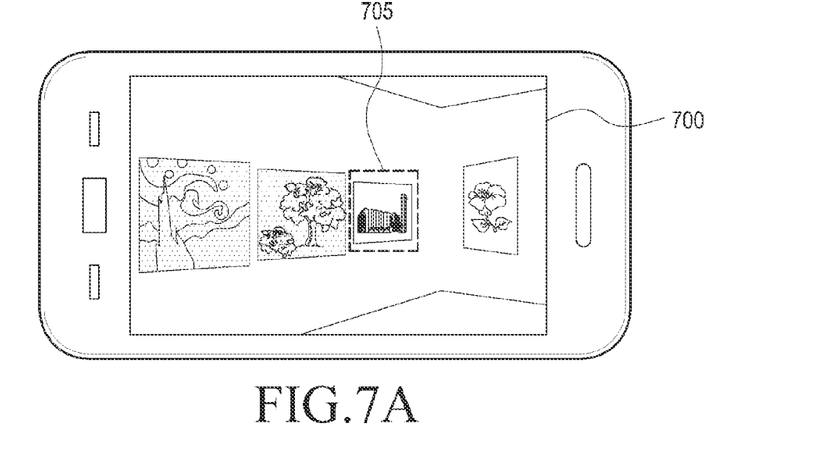
FIGS. 7A to 7C are diagrams illustrating screens that simultaneously display a preview image and a high-definition cropped image, according to an embodiment of the present invention.
Figure 7B:
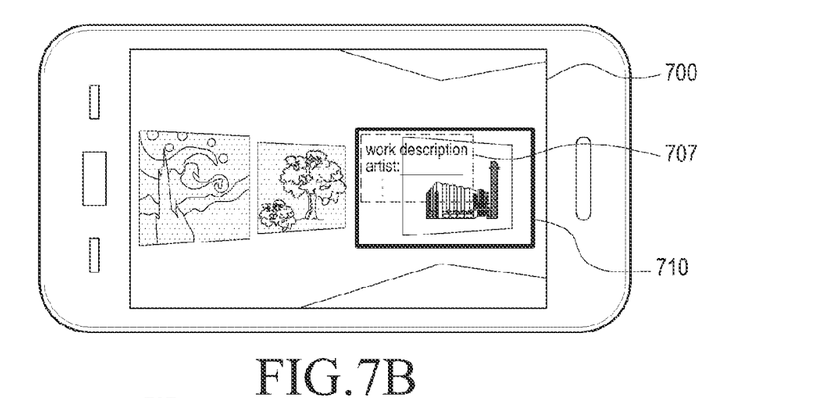
Figure 7C:
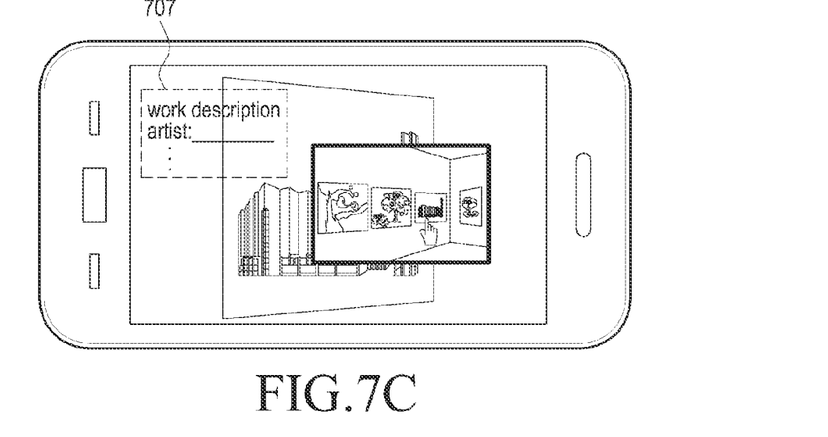

FIGS. 7A to 7C are diagrams illustrating examples of a screen configured to simultaneously display a preview image and a high-definition cropped image according to an embodiment of the present invention.

Referring to FIG. 7A, a specific area 705 is selected by a user input, while a preview image generated by capturing a subject is displayed on a screen 700 of an image processing device.

As illustrated in FIG. 7B, a high-definition cropped image 710 corresponding to the specific area 705 selected by the user is displayed on the preview image 700 in an overlaying manner. In order to be displayed as in FIG. 7B, the images may undergo the process illustrated in FIG. 8.

Figure 8:
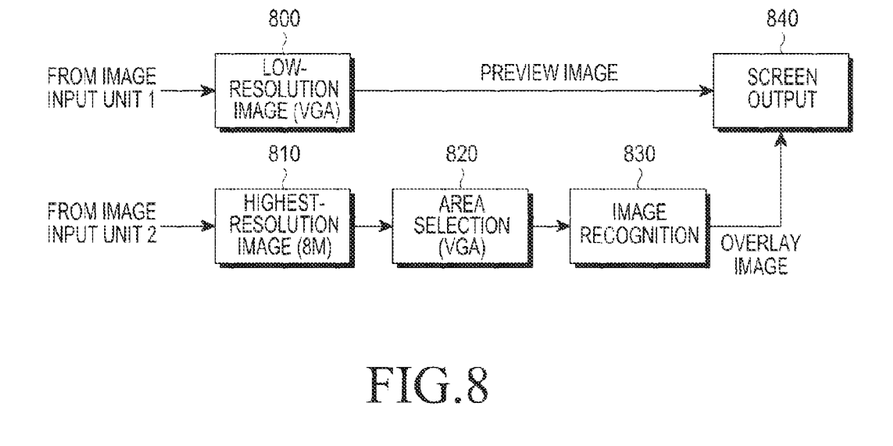
FIGS. 8 and 9 are diagrams illustrating utilizing images of different resolutions, according to an embodiment of the present invention.

For example, as illustrated in FIG. 8, when a low-resolution image 800 is received through the first image input unit 105, the low-resolution image 800 is used as a preview image and displayed on the image display 145. Conversely, when a highest-resolution image 810 is received through the second image input unit 110, the image processing device selects (820) an area corresponding to the specific area 705, which was selected by the user in FIG. 7A, from the highest-resolution image 810. Thereafter, the image processing device performs image recognition (830) on the selected area within the highest-resolution image 810 based on an image recognition algorithm. Accordingly, a screen is output (840), on which the preview image and an overlay image including the image recognition results are displayed together. That is, as illustrated in FIG. 7B, the recognition results obtained by performing image recognition on the overlaid high-definition cropped image is displayed together with the preview image.

For example, as illustrated in FIG. 7B, when a user selects an area of specific objects, for example, pictures, while viewing a preview image generated by capturing an art gallery, a high-definition cropped image including the recognition results such as the work description 707 for a picture in the high-definition cropped image corresponding to the selected area is displayed together with the preview image. The display positions of the high-definition cropped image and the preview image in FIG. 7B are changed as illustrated in FIG. 7C.

Figure 9:
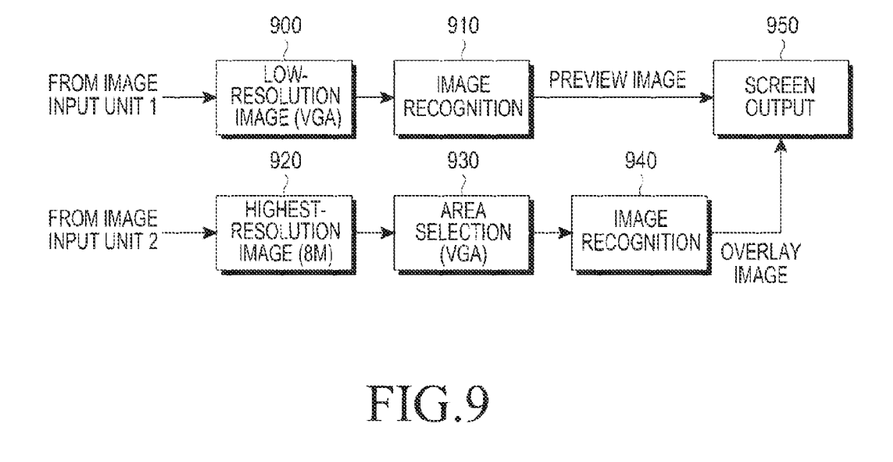

Although the high-definition cropped image undergoes image recognition in the foregoing description by way of example, the preview image may also undergo image recognition as in FIG. 9. FIG. 9 is the same as FIG. 8 in the remaining process except for a process 910, so its detailed description will be omitted. In the process illustrated in FIG. 9, both the preview image and the high-definition cropped image may undergo image recognitions for different purposes. For example, the low-definition preview image with a large view angle is used to form a 3D map by undergoing the image recognition process 910, and at the same time, the high-definition cropped image is used to recognize an object in the 3D space.

Therefore, according to an aspect of the present invention, the image processing device obtains a high-resolution image for a high-definition crop area, compared to the image obtained by processing in a mono camera and the image obtained by the digital zoom scheme, making it possible to improve recognition performance.

In addition, the image processing device simultaneously displays a preview image and an enlarged image for a selected area by differentiating magnifications of images received through two or more cameras, so the user may view the high-definition enlarged image. Further, the image processing device performs image recognition even on the high-definition enlarged image, contributing to expanded utilization in image processing.

The embodiments of the present invention may be implemented as hardware, software, or a combination thereof. The software is stored, for example, in a volatile or non-volatile erasable or rewritable storage device such as a Read Only Memory (ROM), or for example, in a memory such as a Random Access Memory (RAM), a memory chip and an Integrated Circuit (IC), or for example, in an optically or magnetically recordable, machine-readable storage medium such as a Compact Disk (CD), a Digital Versatile Disk (DVD), a magnetic disk and magnetic tape. Storage refers to, for example, a machine-readable storage medium suitable to store a program or programs including instructions for implementing the image processing method, according to an embodiment of the present invention. Therefore, embodiments of the present invention include programs including codes for implementing the image processing method, and a machine-readable storage medium storing the programs. These programs are electrically transferred through any medium such as communication signals which are delivered by wire/wireless connections.

In addition, the image processing device stores the programs received from a program providing device, which is connected to the image processing device by wire or wirelessly. The program providing device includes a memory for storing a program(s) including instructions for allowing the image processing device to perform the method of improving the quality of an enlarged image, and information necessary for the method of improving the quality of an enlarged image, a communication unit for performing wire/wireless communication with the image processing device, and a controller for transmitting the program to the image processing device automatically or upon request of the image processing device.

While the present invention has been shown and described with reference to various embodiments thereof, it will be understood by those skilled in the art that various changes in form and details may be made therein without departing from the spirit and scope of the invention as defined by the appended claims and their equivalents.

What is claimed is:

1. An apparatus for improving quality of an enlarged image, comprising:
   a first image input unit and a second image input unit configured to output a first image and a second image, respectively, which are obtained by capturing a same subject from different positions, spaced apart by a predetermined gap;
   a first image processor configured to convert a resolution of the first image to a first resolution;
   a display configured to display the first image outputted from the first image processor;
   a second image processor configured to:
   convert a resolution of the second image to a second resolution set higher than the first resolution;
   when a first area to be enlarged in the displayed the first image is selected, determine a second area corresponding to the first area in the second image using a parallax between the first image converted to the first resolution and the second image converted to the second resolution and a resolution difference between the second resolution and the first resolution; and
   crop an image corresponding to the second area from the second image; and
   a controller configured to control the display to display the cropped image on the first image in an overlaying manner.

2. The apparatus of claim 1, wherein a resolution of the first image outputted from the first image input unit is equal to a resolution of the second image outputted from the second image input unit.

3. The apparatus of claim 1, wherein the second resolution is set between the first resolution and the highest resolution supported by the apparatus.

4. The apparatus of claim 1, wherein the first image processor calculates coordinate information about the first area when the first area is selected by the user and transmit the coordinate information about the first area to the second image processor.

5. The apparatus of claim 4, wherein the second image processor converts the resolution of the second image to the first resolution and sets an interest area in the converted second image on the basis of the coordinate information received from the first image processor.

6. The apparatus of claim 5, wherein the second image processor identifies the parallax between the first image and the second image and determines a third area corresponding to the first area within the interest area set in the converted second image using the identified parallax.

7. The apparatus of claim 6, wherein the second image processor determines the second area in the second image by converting a resolution of the third area to the second resolution.

8. The apparatus of claim 1, further comprising a user interface for selecting the first area to be enlarged.

9. A method for improving quality of an enlarged image in an image processing device, comprising:
 obtaining a first image and a second image by capturing a same subject from different positions, spaced apart by a predetermined gap;
 converting a resolution of the first image to a first resolution;
 displaying the first image, and determining whether a first area to be enlarged in the displayed first image is selected;
 converting a resolution of the second image to a second resolution set higher than the first resolution;
 when the first area to be enlarged in the displayed the first image is selected, determining a second area corresponding to the first area in the second image using a parallax between the first image converted to the first resolution and the second image converted to the second resolution and a resolution difference between the second resolution and the first resolution;
 cropping an image corresponding to the second area from the second image; and
 displaying the cropped image on the first image in an overlaying manner.

10. The method of claim 9, wherein a resolution of the first image outputted from a first image input unit is equal to a resolution of the second image outputted from a second image input unit.

11. The method of claim 9, wherein the second resolution is set between the first resolution and the highest resolution supported by the image processing device.

12. The method of claim 9, further comprising:
 calculating coordinate information about the first area when the first area is selected; and
 transmitting the coordinate information about the first area.

13. The method of claim 12, wherein determining the second area corresponding to the first area in the second image comprises:
 converting the resolution of the second image to the first resolution; and
 setting an interest area in the converted second image on the basis of the coordinate information received.

14. The method of claim 13, wherein determining the second area corresponding to the first area in the second image further comprises:
 identifying the parallax between the first image and the second image; and
 determining a third area corresponding to the first area within the interest area set in the converted second image using the identified parallax.

15. The method of claim 14, wherein determining the second area corresponding to the first area in the second image further comprises:
 determining the second area in the second image by converting a resolution of the third area to the second resolution.

16. The apparatus of claim 1, wherein the controller performs image recognition on the image corresponding to the second area in the second image and control the display to display image recognition results in accordance with the image recognition.

17. The method of claim 9, further comprising:
 performing image recognition on the image corresponding to the second area in the second image; and
 displaying image recognition results in accordance with the image recognition.

* * * * *